(12) United States Patent
Miyamoto et al.

(10) Patent No.: US 7,883,095 B2
(45) Date of Patent: Feb. 8, 2011

(54) ANNULAR SEAL MEMBER FOR USE IN SPHERICAL EXHAUST PIPE JOINT, AND PRODUCTION METHOD THEREOF

(75) Inventors: Mamoru Miyamoto, Yao (JP); Masaru Noda, Osaka (JP)

(73) Assignee: Best Corporation, Osaka (JP)

( * ) Notice: Subject to any disclaimer, the term of this patent is extended or adjusted under 35 U.S.C. 154(b) by 127 days.

(21) Appl. No.: 11/630,409

(22) PCT Filed: Aug. 7, 2006

(86) PCT No.: PCT/JP2006/315590

§ 371 (c)(1),
(2), (4) Date: Dec. 21, 2006

(87) PCT Pub. No.: WO2007/018173

PCT Pub. Date: Feb. 15, 2007

(65) Prior Publication Data
US 2008/0211195 A1    Sep. 4, 2008

(30) Foreign Application Priority Data
Aug. 9, 2005   (JP) .............................. 2005-231346

(51) Int. Cl.
*F16J 15/32* (2006.01)
(52) U.S. Cl. ...................... 277/627; 277/650
(58) Field of Classification Search ................. 277/611, 277/627, 650–654
See application file for complete search history.

(56) References Cited

U.S. PATENT DOCUMENTS

| | | | |
|---|---|---|---|
| 4,607,851 A | | 8/1986 | Usher |
| 5,462,291 A | * | 10/1995 | Maeda et al. ............... 277/507 |
| 5,505,498 A | * | 4/1996 | Halling et al. .............. 285/111 |
| 5,765,838 A | * | 6/1998 | Ueda et al. .................. 277/650 |
| 5,909,881 A | * | 6/1999 | Segawa ....................... 277/627 |
| 7,063,330 B2 | * | 6/2006 | Kubota et al. ............... 277/627 |
| 2004/0066007 A1 | * | 4/2004 | Kubota et al. ............... 277/608 |
| 2006/0091616 A1 | * | 5/2006 | Kubota et al. ............... 277/627 |

FOREIGN PATENT DOCUMENTS

| | | |
|---|---|---|
| GB | 2 271 398 | 4/1994 |
| JP | 54-76759 | 11/1952 |
| JP | 58-24620 | 2/1983 |
| JP | 5-71338 | 3/1993 |

(Continued)

*Primary Examiner*—Shane Bomar
*Assistant Examiner*—Gilbert Y Lee
(74) *Attorney, Agent, or Firm*—Wenderoth, Lind & Ponack, L.L.P.

(57) ABSTRACT

An annular seal member for use in a spherical exhaust pipe joint is provided with, on an inner peripheral surface and an outer peripheral surface thereof, a sliding surface for slidably moving the spherical exhaust pipe joint. The annular seal member includes an annular mesh structural body having a compressed wire mesh; and a heat-resistant sheet member which is compressed to be integrally formed with the compressed wire mesh. At least a part of the compressed wire mesh which is exposed from the sliding surface has a dispersive plating layer in which at least one kind of particle selected from the group consisting of fluorine resin particles, boron nitride particles, molybdenum disulfide particles, and silicon carbide particles is dispersed.

8 Claims, 15 Drawing Sheets

FOREIGN PATENT DOCUMENTS

| | | |
|---|---|---|
| JP | 3139179 | 5/1994 |
| JP | 2002-267062 | 9/2002 |
| JP | 2003-14177 | 1/2003 |
| JP | 2003-21283 | 1/2003 |
| JP | 2004-204879 | 7/2004 |

* cited by examiner

FIG.7A
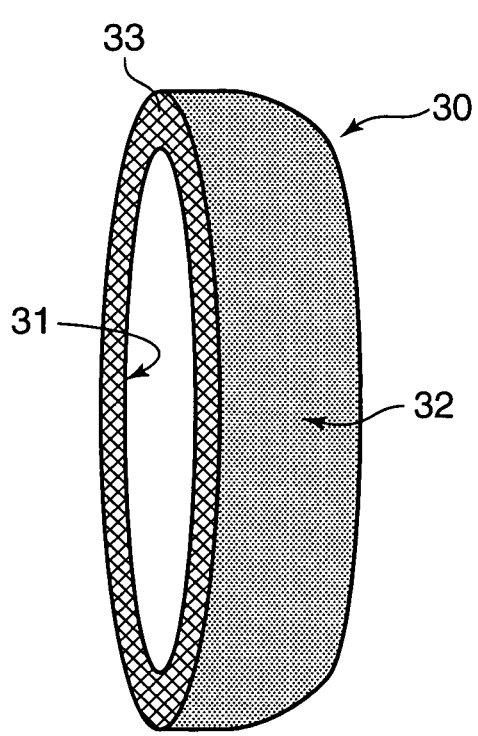
FIG.7B
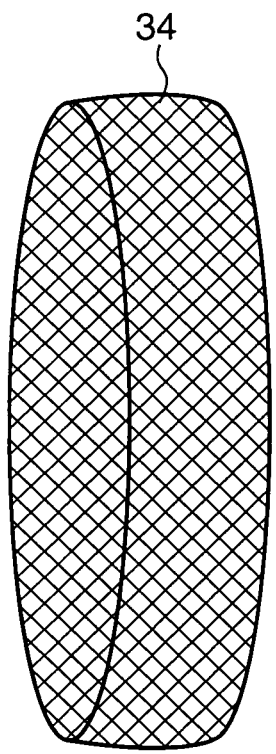
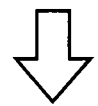
FIG.7C
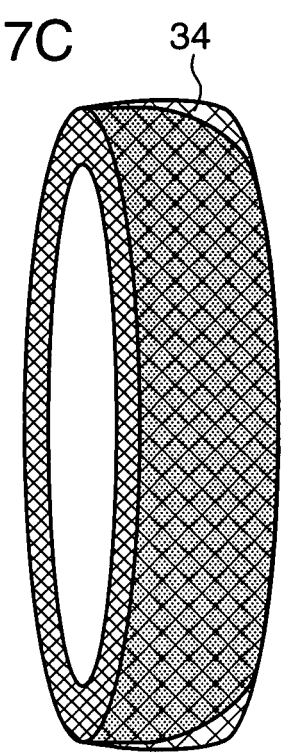

ANNULAR SEAL MEMBER FOR USE IN SPHERICAL EXHAUST PIPE JOINT, AND PRODUCTION METHOD THEREOF

BACKGROUND OF THE INVENTION

I. Technical Field

This invention relates to an annular seal member for use in a spherical exhaust pipe joint which is adapted as an exhaust gas seal member for a spherical joint for use in connecting an exhaust pipe to be connected to an engine of an automobile or a like vehicle.

II. Description of the Related Art

Exhaust gas to be exhausted from an engine of an automobile or a two-wheeled motor vehicle is processed by a catalyst, and then, is exhausted out into the air through an exhaust pipe.

In the case of an automobile, for instance, an exhaust pipe extending from an exhaust section of an engine to a muffler section provided at a rear portion of a vehicle body is fixed to a bottom portion of the vehicle body. The exhaust pipe in the fixed state is oscillated and periodically exerted with a flexure load while being subjected to an inertia force resulting from oscillations due to a torque reaction of the engine, or acceleration/deceleration exerted thereto in driving the automobile. Such a flexure load may cause fatigue or breakage of the exhaust pipe.

An exhaust pipe equipped with a movable spherical joint 100 as shown in FIG. 14 is known as a measure for solving the above drawback.

In FIG. 14, 111 denotes an annular seal member, 110 denotes an upstream exhaust pipe to be connected to an engine section (not shown), 120 denotes a downstream exhaust pipe which is opposed to the upstream exhaust pipe 110 and is connected to an muffler section (not shown), and 130 denotes a flared seal seat having a partially concave spherical surface.

A flange portion 140 is formed on an outer peripheral surface of the upstream exhaust pipe 110, except for a portion corresponding to a pipe end portion 101 for engaging with the annular seal body 111.

The flared seal seat 130 having the partially concave spherical surface is formed on a distal portion of the downstream exhaust pipe 120. The downstream exhaust pipe 120 further includes a flange portion 150 which is integrally formed with the seal seat 130.

The annular seal member 111 is fittingly seated on a cylindrical inner surface 1 at the pipe end portion 101 in a state that the flange portion 140 is abutted against an annular end surface 3 formed on a large-diameter side of the pipe end portion 101. The downstream exhaust pipe 120 is arranged in such a manner that a partially convex spherical surface 2 serving as a sliding surface of the annular seal member 111 is brought into plane contact with the partially concave spherical surface of the seal seat 130.

The upstream exhaust pipe 110 and the downstream exhaust pipe 120 are connected with each other by threadably engaging a male threaded portion of a bolt 160 extending through the flange portion 150 in a female threaded portion of the flange portion 140. The bolt 160 extends in a coil spring 170. By threadably engaging and screwing the male threaded portion and the female threaded portion, the downstream exhaust pipe 120 is urged toward the upstream exhaust pipe 110 by a spring force. The spring force allows a relative angular displacement in oscillations of the exhaust pipe, thereby suppressing fatigue and breakage of the exhaust pipe resulting from oscillations of the exhaust pipe.

An example of the seal member to be used in the spherical joint is, for instance, disclosed in Japanese Unexamined Patent Publication No. 54-76759. Japanese Unexamined Patent Publication No. 54-76759 discloses an annular seal member which comprises a compressed wire mesh and graphite filled in the wire mesh, and which has an outer peripheral surface with a partially convex spherical configuration.

In using the seal member, however, when the spherical joint is oscillated, abnormal noise may be generated. Conceivably, generation of the abnormal noise is attributable to adhesion of the graphite filled in the seal member onto the seal seat, and abrasion of the adhered graphite against the graphite filled in the seal member.

Based on the above finding, Japanese Unexamined Patent Publication No. 58-24620 discloses a seal member having an arrangement that a lubricating composition comprising a quadrivalent ethylene fluoride resin, or a copolymer of quadrivalent ethylene fluoride and sexivalent propylene fluoride is coated on a surface of the seal member produced by compression molding a heat-resistant material including expansive graphite, mica, asbestos together with a reinforcing material including a reticular substance. The lubricating composition coated on the surface of the seal member prevents the expansive graphite and the like from adhering onto the seal seat, thereby reducing friction noise.

In the above arrangement, however, if the seal member is used in a high temperature condition of e.g. 300° C. or more, the lubricating composition may be melted or decomposed. As a result, a sufficient effect of reducing the friction noise may not be obtained.

In an attempt to solve the above drawback, Japanese Patent No. 3139179 discloses a spherical zone seal body for use in a spherical exhaust pipe joint. The spherical zone seal body is a compression molded product made of a reinforcing member including a reticular substance, and a heat-resistant material including expansive graphite, and is formed with a partially convex spherical portion on an outer peripheral surface thereof. Japanese Patent No. 3139179 recites that a lubricating layer comprising boron nitride, and at least one selected from the group consisting of alumina and silica is formed on a surface of the partially convex spherical portion.

The lubricating layer recited in Japanese Patent No. 3139179 includes boron nitride as a main ingredient. The boron nitride is a lubricating material which is less likely to be melted or decomposed at a high temperature. However, the lubricating layer including boron nitride as a single constituent is inferior in its adhesion onto the surface of the partially convex spherical portion. The invention recited in Japanese Patent No. 3139179 discloses means for improving the adhesion by adding at least one selected from the group consisting of alumina and silica, in addition to the boron nitride.

Even with use of the lubricating layer made of the lubricating composition including at least one selected from the group consisting of alumina and silica, in addition to the boron nitride, however, the adhesion is insufficient. In the case where a seal body formed with the lubricating layer having such an insufficient adhesion is incorporated in a spherical joint, the lubricating layer may be exfoliated by abrasion due to a friction of the sliding surface of the seal body against the surface of the seal seat resulting from oscillations of the spherical joint. As a result, the effect of reducing friction noise lasts only for a short time.

Japanese Patent No. 3139179 also recites a seal body formed with a lubricating layer including a polytetrafluoroethylene resin, in addition to the lubricating composition comprising boron nitride, and at least one selected from the group consisting of alumina and silica in order to enhance the adhesion. The polytetrafluoroethylene resin exhibits superior lubricity owing to its low friction property, and serves as a binder of the boron nitride or a like compound.

If the seal body formed with the lubricating layer is used in a spherical exhaust pipe joint, the effect of reducing friction noise can be obtained at ambient low temperature. However, in using the seal body at ambient high temperature corresponding to a condition where the surface temperature of the partially convex spherical portion is 300 ° C. or exceeds 400 ° C., the polytetrafluoroethylene resin may be melted or decomposed, thereby losing the function as the binder. As a result, the adhesion of the lubricating layer comprising boron nitride may be degraded, thereby resulting in exfoliation of the lubricating layer.

It has been found that the friction noise that is generated when the lubricating layer is exfoliated is of a kind of noise that is generated by the friction of metals.

It has been conceived that the friction noise similar to the noise resulting from friction of metals is generated for the following reason. Specifically, exfoliation of the lubricating layer causes direct friction of the wire mesh of the seal body against the seal seat, or friction of metallic powders generated by abrasion of the wire mesh against the seal seat, which resultantly causes the friction noise.

SUMMARY OF THE INVENTION

As a result of the examination, it has been found that improving lubricity or abrasion resistance of a wire mesh which is exposed from the sliding surface enables suppression of the friction noise similar to the noise caused by friction of metals, and achieved in the present invention.

An aspect of the present invention is directed to an annular seal member for use in a spherical exhaust pipe joint provided with, on an inner peripheral surface and an outer peripheral surface thereof, a sliding surface for slidably moving the spherical exhaust pipe joint. The annular seal member includes an annular mesh structural body having a compressed wire mesh; and a heat-resistant sheet member which is compressed to be integrally formed with the compressed wire mesh. At least a part of the compressed wire mesh which is exposed from the sliding surface has a dispersive plating layer in which at least one kind of particles selected from the group consisting of fluorine resin particles, boron nitride particles, molybdenum disulfide particles, and silicon carbide particles are dispersed.

Another aspect of the invention is directed to a method for producing an annular seal member for use in a spherical exhaust pipe joint. The method comprises: a convolute member forming step of superposing, one on top of the other, a band-shaped heat-resistant seal sheet, and a dispersive-plated zone wire mesh having a dispersive plating layer in which at least one kind of particles selected from the group consisting of fluorine resin particles, boron nitride particles, molybdenum disulfide particles, and silicon carbide particles are dispersed to form a laminated member, and of winding the laminated member into a convolute member; a convolute member mounting step of mounting the convolute member in a bottomed annular die provided with a solid cylindrical core in the middle part of the bottomed annular die; and a compression molding step of compression molding the convolute member in a direction of a center axis of the convolute member.

Yet another aspect of the invention is directed to a method for producing an annular seal member for use in a spherical exhaust pipe joint. The method comprises: a convolute member forming step of superposing a non-dispersive-plated zone wire mesh and a band-shaped heat-resistant seal sheet one on top of the other to form a laminated member, and of winding the laminated member into a convolute member; a first compression molding step of mounting the convolute member in a bottomed annular die provided with a solid cylindrical core in the middle part of the bottomed annular die, and of compression molding the convolute member in a direction of a center axis of the convolute member to form an annular seal member perform; and a second compression molding step of placing a dispersive-plated wire mesh in which at least one kind of particles selected from the group consisting of fluorine resin particles, boron nitride particles, molybdenum disulfide particles, and silicon carbide particles are dispersed over the annular seal member perform in such a manner that at least one surface selected from the group consisting of an outer peripheral surface and an inner peripheral surface of the annular seal member perform is covered by the dispersive-plated wire mesh, and of compression molding the dispersive-plated wire mesh and the annular seal member perform together.

These and other objects, features, aspects, and advantages of the present invention will become more apparent upon reading of the following detailed description along with the accompanying drawings.

BRIEF DESCRIPTION OF THE DRAWINGS

FIGS. 7A through 7C are diagrams showing an example of a production process of an annular seal member in a second embodiment of the invention, wherein FIG. 7A shows a spherical zone seal member preform, FIG. 7B shows a dispersive-plated wire mesh, and FIG. 7C shows the spherical zone seal member preform covered with the dispersive-plated wire mesh.

DETAILED DESCRIPTION OF THE INVENTION

First Embodiment

Figure 1:
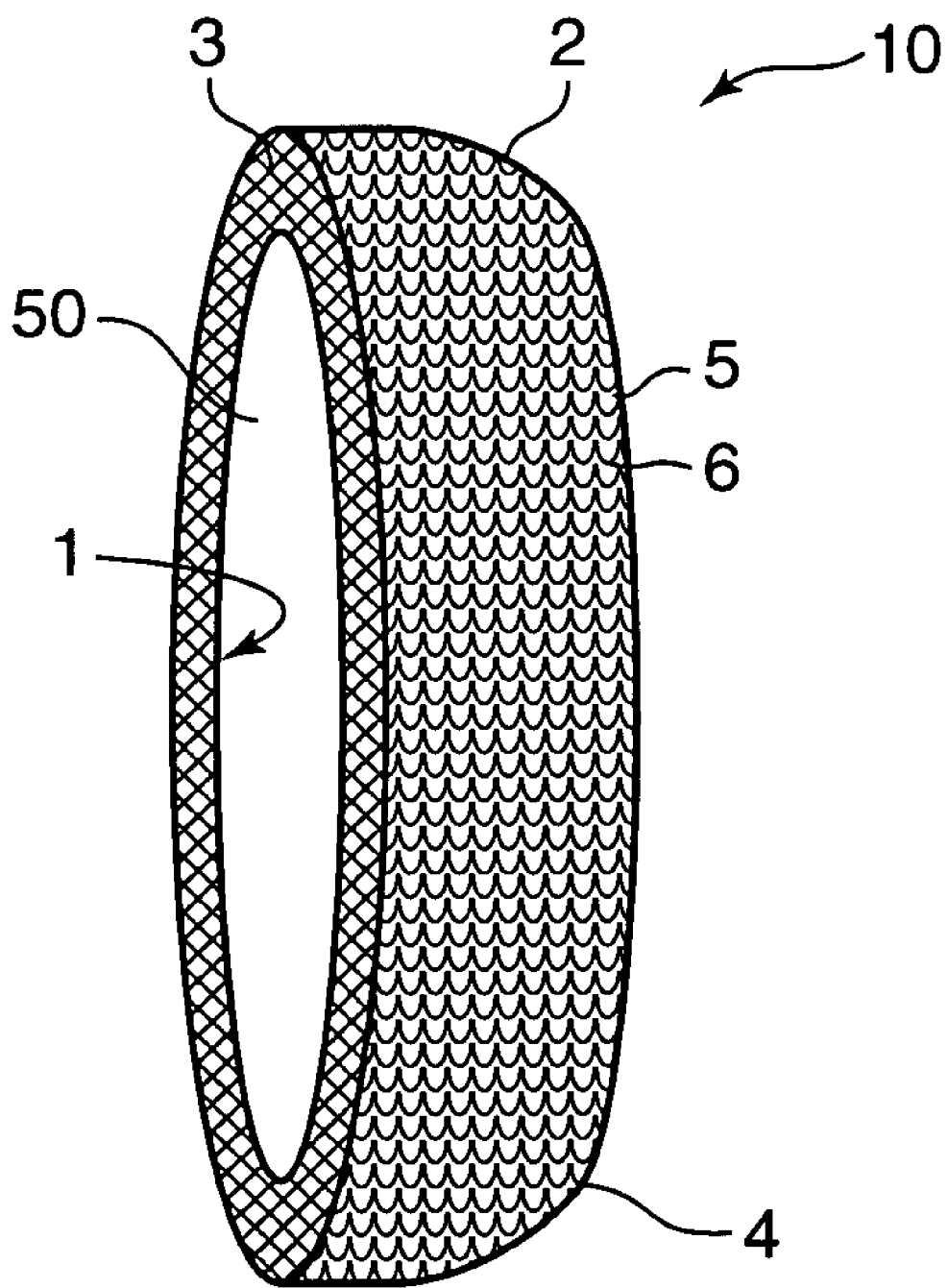
FIG. 1 is a diagram showing an example of a configuration of an annular seal member in a first embodiment of the invention.
Figure 2:
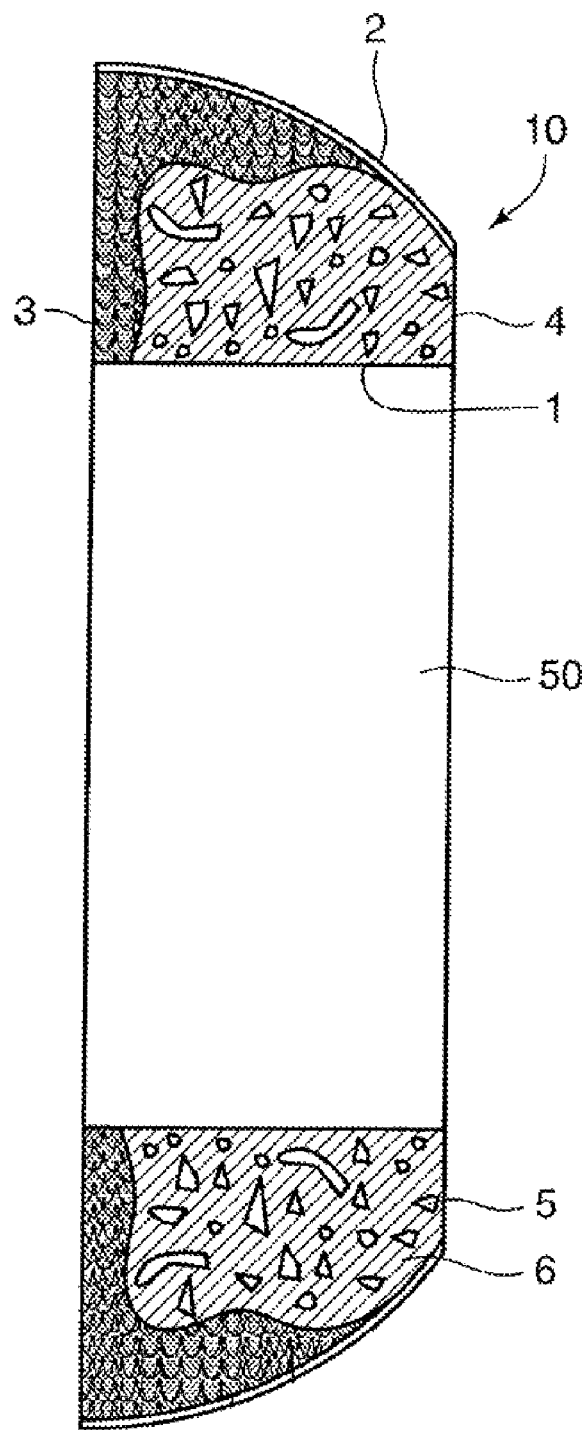
FIG. 2 is a partially sectional view showing the configuration of the annular seal member in the first embodiment of the invention.

A first embodiment of an annular seal member according to the invention is described while referring to FIGS. 1 and 2.

FIG. 1 is a diagram showing a spherical zone annular seal member 10 provided with an outer peripheral surface shaped into a partially convex spherical configuration, as the first embodiment of the annular seal member of the invention. FIG. 2 is a partial section view of FIG. 1.

Referring to FIGS. 1 and 2, 1 denotes a cylindrical inner surface for defining a through-hole 50, 2 denotes a partially convex spherical surface, 3 denotes an annular end surface formed on a large-diameter side of the partially convex spherical surface 2, and 4 denotes an annular end surface formed on a small-diameter side of the partially convex spherical surface 2. The annular seal member 10 has its configuration defined by the respective surfaces constituting the annular seal member 10. The annular seal member 10 comprises an annular mesh structural body including a compressed wire mesh 5, and a heat-resistant seal member 6 which contains expansive graphite and the like, and is integrally compressed with the annular mesh structural body.

The annular seal member 10 has such a configuration that the partially convex spherical surface 2 serves as a sliding surface, and is brought into plane contact with a surface of a flared seal seat having a partially concave spherical surface, which is formed on a spherical exhaust pipe joint to be described later.

The wire mesh exposed from the partially convex spherical surface 2 of the annular seal member 10 is formed with a dispersive plating layer in which at least one kind of particle, selected from the group consisting of fluorine resin particles, boron nitride particles, molybdenum disulfide particles, and silicon carbide particles is dispersed.

An exemplified method for producing the annular seal member 10 is described as follows.

The heat-resistant seal member for use in producing the annular seal member 10 is made of a material including, as a main ingredient, an inorganic material having a heat resistance and gas sealability, such as expansive graphite or mica. A heat-resistant seal sheet for use in the annular seal member production method is a processed sheet having a thickness of about 0.1 to 1mm. A sheet having a high heat resistance, e.g., a sheet whose oxidation start temperature is 800° C. or more, is particularly preferred. Preferred examples of the sheet are: expansive graphite sheets such as an expansive graphite sheet PF-G3 (thickness: 0.4 mm, product of Toyo Carbon Co. Ltd.), and an expansive graphite sheet APX-2 (thickness: 0.38 mm, product of SGL); and a mica sheet TYPE 36.006 (product of Electro Isola). Among them, a heat-resistive expansive graphite sheet is preferably used in the aspect of its superior gas sealability and heat resistance.

The zone wire mesh to be used in production of the annular seal member 10 can be produced by the following process.

Figure 3:
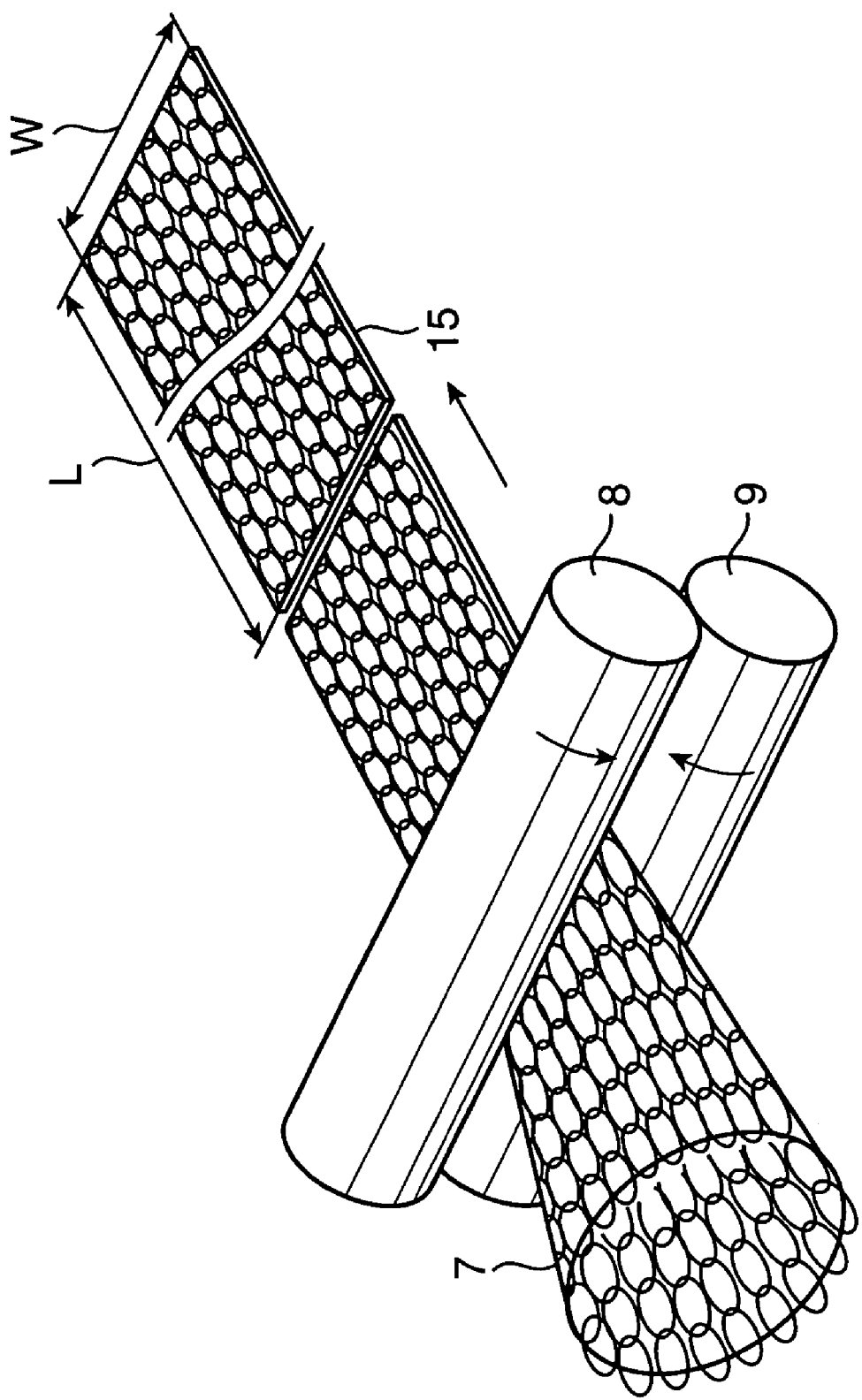
FIG. 3 is a diagram showing an example of a method for producing a zone wire mesh to be used in a production process of the annular seal member in the first embodiment of the invention.

As shown in FIG. 3, a cylindrical wire mesh 7 obtained by weaving or knitting a fine metal wire having a diameter φ from about 0.10 to 0.35 mm into a cylindrical shape is passed between a pair of rollers 8 and 9, and shaped into a wire mesh having a predetermined width W, and then cut into a predetermined length L, whereby a zone wire mesh 15 is produced.

Examples of the fine metal wire are stainless steel wires made of austenite stainless steel such as SUS304 or SUS316, or made of ferrite stainless steel such as SUS430; iron-based wires (JIS-G-3532) or zinc-plated iron wires (JIS-G-3547); and fine metal wires made of copper alloys such as copper-nickel alloy (cupro-nickel), copper-nickel-zinc alloy (nickel silver), brass, or beryllium copper.

The wire mesh 5 is exposed from the outer peripheral surface of the annular seal member 10, serving as a sliding surface. On the surface of the wire mesh 5 which is exposed from the sliding surface, there is formed a dispersive plating layer, in which at least one kind of particle selected from the group consisting of fluorine resin particles, boron nitride particles, molybdenum disulfide particles, and silicon carbide particles is dispersed in a metal matrix material.

As an example of the dispersive plating layer formation method, there is proposed a general plating method comprising: filling an electroplating bath or an electroless plating bath with a dispersive-particle-containing plating solution obtained by dispersing at least one kind of particle selected from the group consisting of fluorine resin particles, boron nitride particles, molybdenum disulfide particles, and silicon carbide particles in a plating solution containing a metal matrix material; immersing a wire mesh into the plating bath; and co-depositing the dispersive particles and the metal onto the surface of the wire mesh by a well-known electrolytic plating technique or electroless plating technique. Heat-treating the thus formed plating layer at a temperature of about 200 to 400° C. or preferably of about 250 to 350° C. provides the plating layer with a high hardness and superior durability.

Examples of the metal matrix material are nickel (Ni) or nickel-based alloys such as nickel-phosphorous (Ni—P); and iron (Fe) or iron-based alloys.

Examples of the fluorine resin particles are polytetrafluoroethylene (PTFE), tetrafluoroethylene-hexafluoropropylene copolymer, tetrafuloroethylene-perfluoroalkylvinylether copolymer.

A Ni plating layer or Ni—P plating layer in which at least one kind of particle selected from the group consisting of fluorine resin particles, boron nitride particles, and molybdenum disulfide particles is dispersed has superior lubricity. In view of this, the aforementioned plating layer is particularly preferred because of its high friction noise suppressing effect. A Ni plating layer or Ni—P plating layer in which silicon carbide particles are dispersed has superior abrasion resistance, and accordingly, is advantageous in suppressing generation of metallic powders. The latter plating layer is preferred because of its effect of suppressing friction noise resulting from abrasion of metallic powders.

The dispersive particles with an average particle diameter of 0.1 to 10 μm, specifically, 0.2 to 3 μm are preferred because of their superior lubricity or abrasion resistance.

The content ratio of the dispersive particles relative to the dispersive plating layer is preferably from 1 to 30% by mass, more preferably 5 to 15% by mass, and furthermore preferably 6 to 10% by mass in terms of lubricity or abrasion resistance. An unduly low content of the dispersive particles may result in insufficient improvement in lubricity or abrasion resistance, which may fail to sufficiently suppress generation of friction noise.

The thickness of the dispersive plating layer is from 3 to 15 µm, preferably, from 5 to 10 µm. As far as the dispersive plating layer satisfies the aforementioned thickness range, a high effect of suppressing friction noise is obtained. An unduly small thickness or an unduly large thickness out of the thickness range may lower retainability of the friction noise suppressing effect.

The annular seal member in the embodiment is produced by the following process, using the aforementioned materials.

Figure 4:
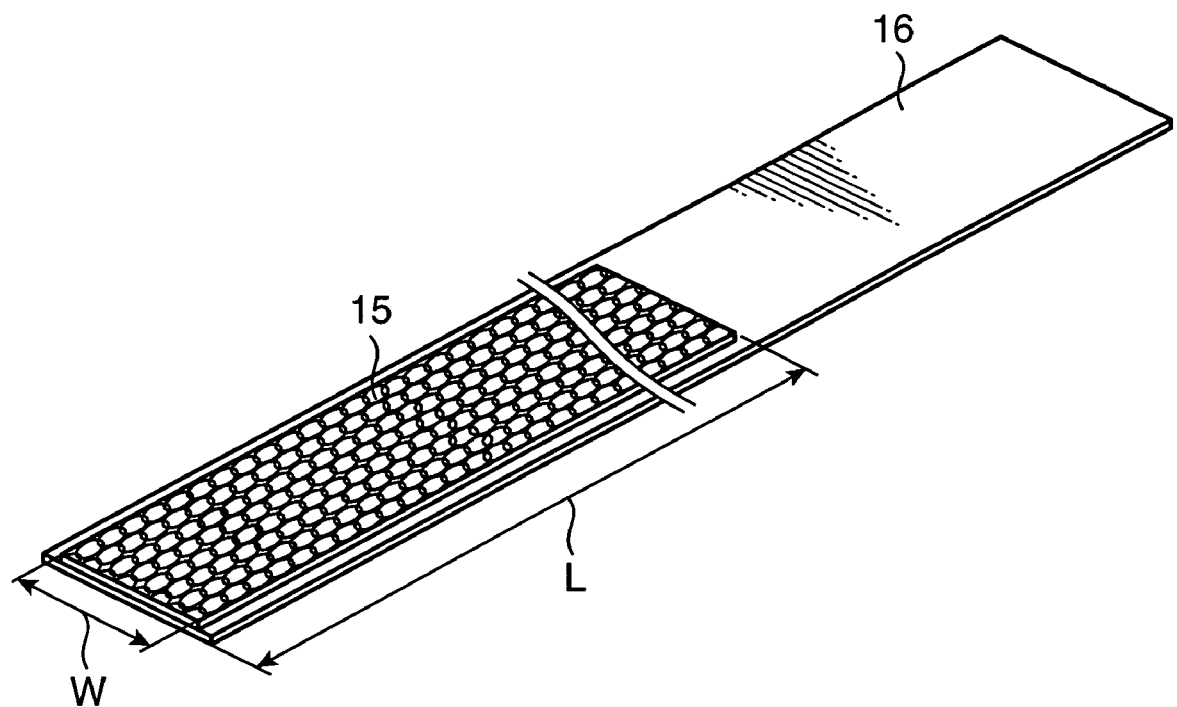
FIG. 4 is a diagram showing an example of a laminated member to be used in the production process of the annular seal member in the first embodiment of the invention.

First, as shown in FIG. 4, a laminated member is formed by superposing the zone wire mesh 15 formed with the dispersive plating layer, and a band-shaped heat-resistant seal sheet 16 one on top of the other. Then, a convolute member 14 is formed by winding the laminated member as shown in FIG. 5.

The widths and the lengths of the dispersive-plated zone wire mesh 15 and the band-shaped heat-resistant seal sheet 16 are structurally calculated based on a mass ratio of the wire mesh and the heat-resistant seal member necessary for retaining the configuration and sealablity of the annular seal member.

Figure 5:
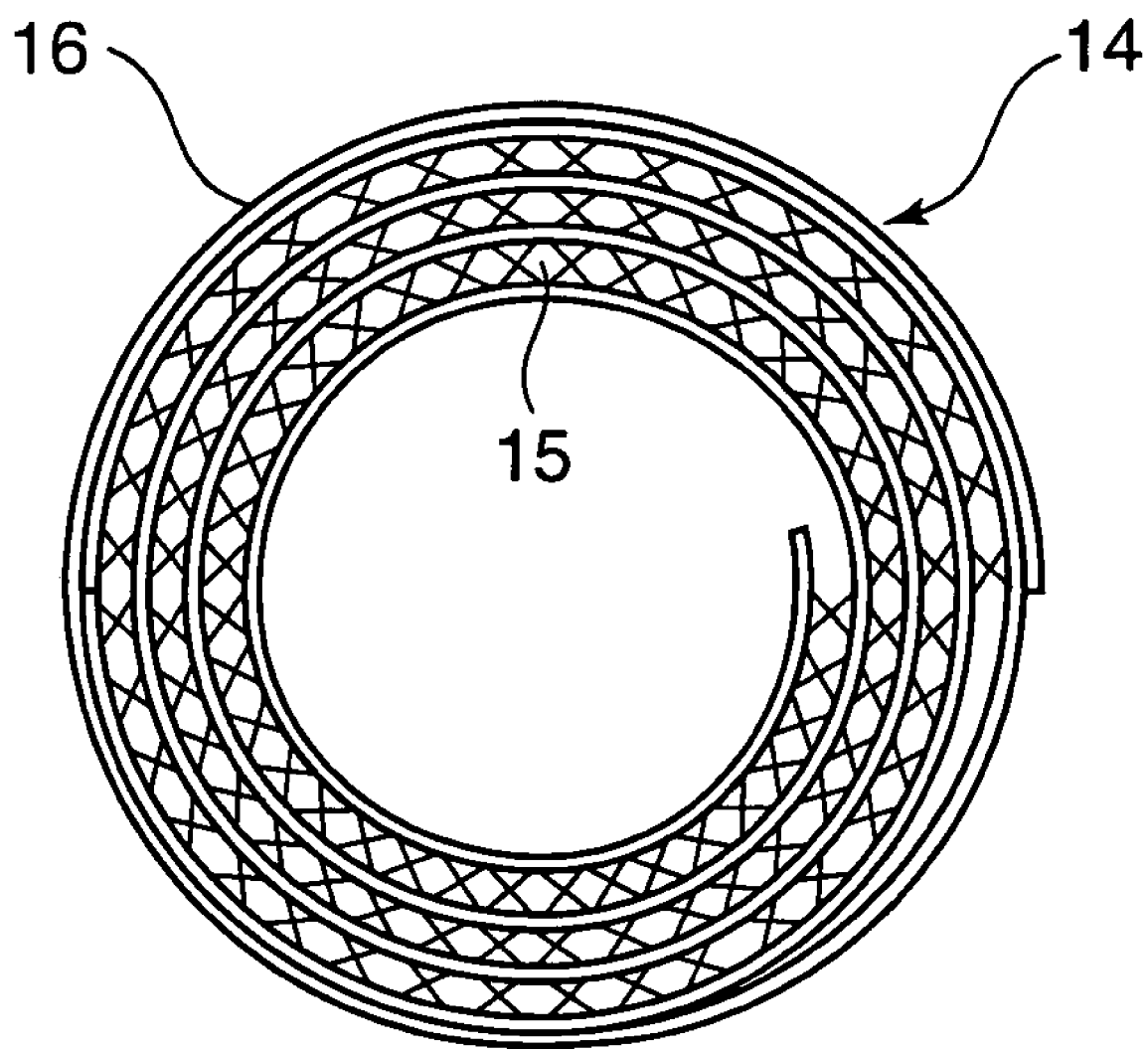
FIG. 5 is a top plan view showing an example of a convolute member to be used in the production process of the annular seal member in the first embodiment of the invention.

As shown in FIG. 5, preferably, the convolute member 14 is configured in such a manner that the length of the heat-resistant seal sheet 16 is larger than the length of the dispersive-plated zone wire mesh 15 so that the inner peripheral surface and the outer peripheral surface of the dispersive-plated zone wire mesh 15 are covered with the heat-resistant seal sheet 16.

Figure 6A:
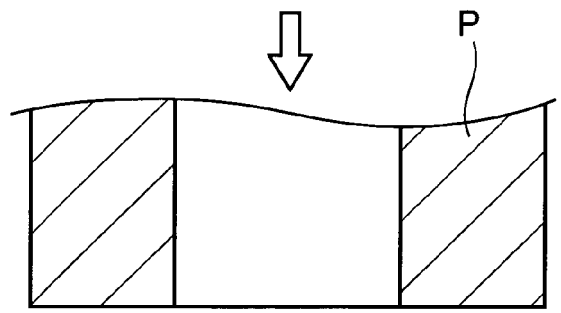
FIG. 6A is a cross-sectional view of a punching section of a compression molding die to be used in producing the annular seal member of the invention.
Figure 6B:
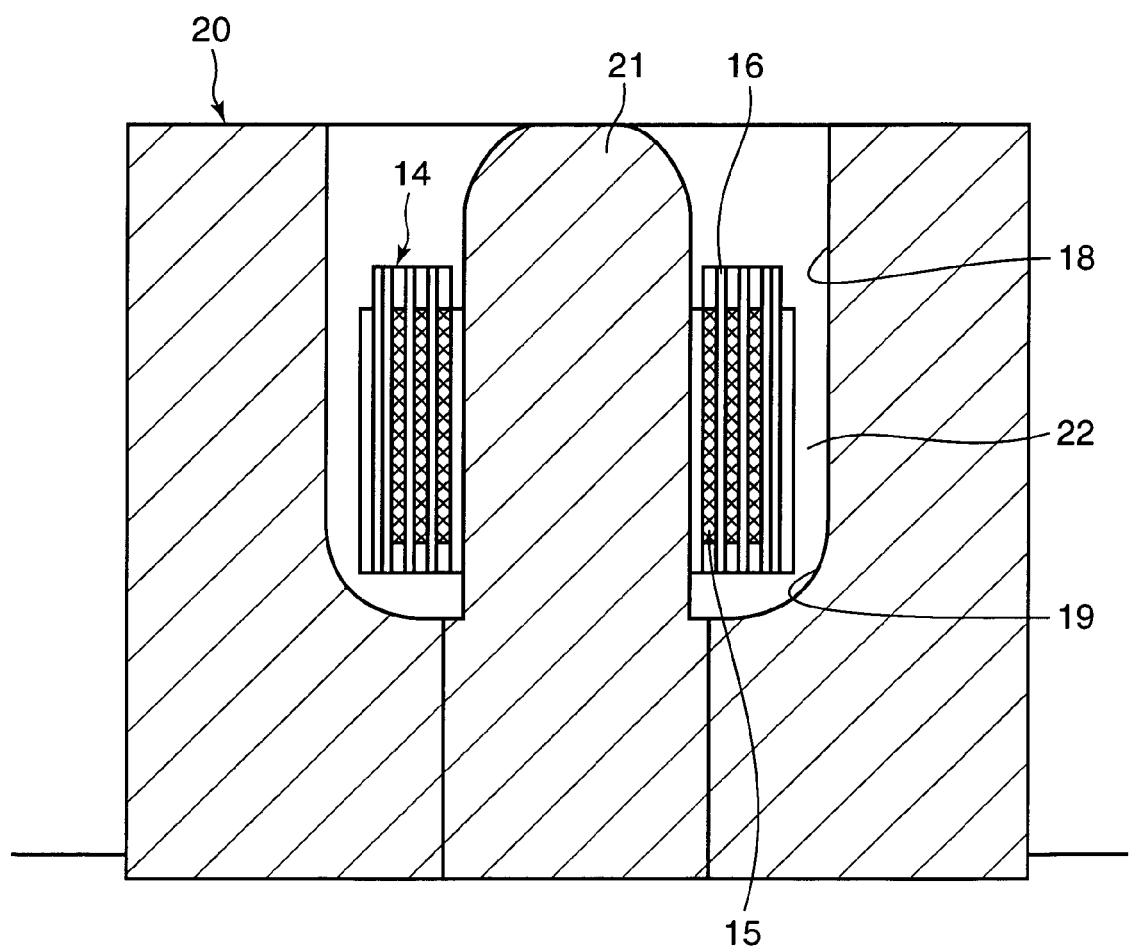
FIG. 6B is a cross-sectional view of the compression molding die to be used in producing the annular seal member of the invention.

The convolute member 14 is mounted in a bottomed annular die 20 provided with a solid cylindrical core 21 in the middle part of the bottomed annular die 20, as shown in FIG. 6B.

The bottomed annular die 20 includes, in its cavity, a cylindrical wall surface 18 and a partially concave spherical wall surface 19 continuing from the cylindrical wall surface 18. The solid cylindrical core 21 is provided in the middle part of the bottomed annular die 20 to define the cylindrical inner surface of the annular seal member.

First, the convolute member 14 is mounted on the solid cylindrical core 21 of the bottomed annular die 20. In mounting, the solid cylindrical core 21 is placed in a central hollow portion of the convolute member 14.

Next, the convolute member 14 mounted in the bottomed annular die 20 is subjected to compression molding. The compression molding is performed by compressing the convolute member 14 by a punching device P located above the cavity 22. In the case where expansive graphite is used as the heat-resistant seal material, a compression pressure is preferably set to such an extent that a bulk density of the expansive graphite is about 1 to 2. By performing the compression molding, the wire mesh can be exposed to such a degree so as to retain sealability on the sliding surface of the annular seal member.

The degree of retaining sealability means a degree of maintaining the function as the annular seal member in practical use. Specifically, it is preferable to provide such a sealability that an air leakage amount per minute from a seal portion is equal to or less than 1 L/min, preferably, equal to or less than 0.5 L/min in the case where, for instance, the annular seal member is attached to an exhaust pipe joint, an end of the exhaust pipe is closed, and an internal pressure of the exhaust pipe is increased by drawing the air into the interior of the exhaust pipe through the other end thereof at 30 kPa (0.3 kgf/cm$^2$).

Performing the aforementioned compression molding enables production of the annular seal member 10 having the features that the heat-resistant seal sheet 16 and the dispersive-plated zone wire mesh 15 are compressed together, and the compressed wire mesh and the compressed heat-resistant seal member are integrally formed. With this arrangement, the wire mesh is exposed from the partially convex spherical surface 2 serving as the sliding surface.

In this way, the annular seal member 10 having the configuration as shown in FIG. 1 is produced.

Preferably, a lubricating layer formed by coating a lubricating substance onto the sliding surface may be additionally formed on the sliding surface of the annular seal member produced by the aforementioned process in order to enhance the lubricity of the sliding surface. The formation of the lubricating layer is advantageous in improving the lubricity at an initial period of oscillations of the spherical exhaust pipe joint.

The lubricating layer can be formed by applying at least one kind selected from the group consisting of fluorine resins such as PTFE, boron nitrides, and molybdenum disulfides onto the sliding surface. These compounds may be used alone or in combination of two or more kinds thereof.

The lubricating layer can be formed by applying an aqueous dispersion for forming the lubricating layer or a like composition onto the sliding surface of the annular seal member by means such as brushing, spraying, or dipping. The thickness of the lubricating layer to be formed is a thickness capable of retaining lubricity in use for a predetermined period. Specifically, a preferred thickness of the lubricating layer is from about 30 to 200 µm.

Figure 15:
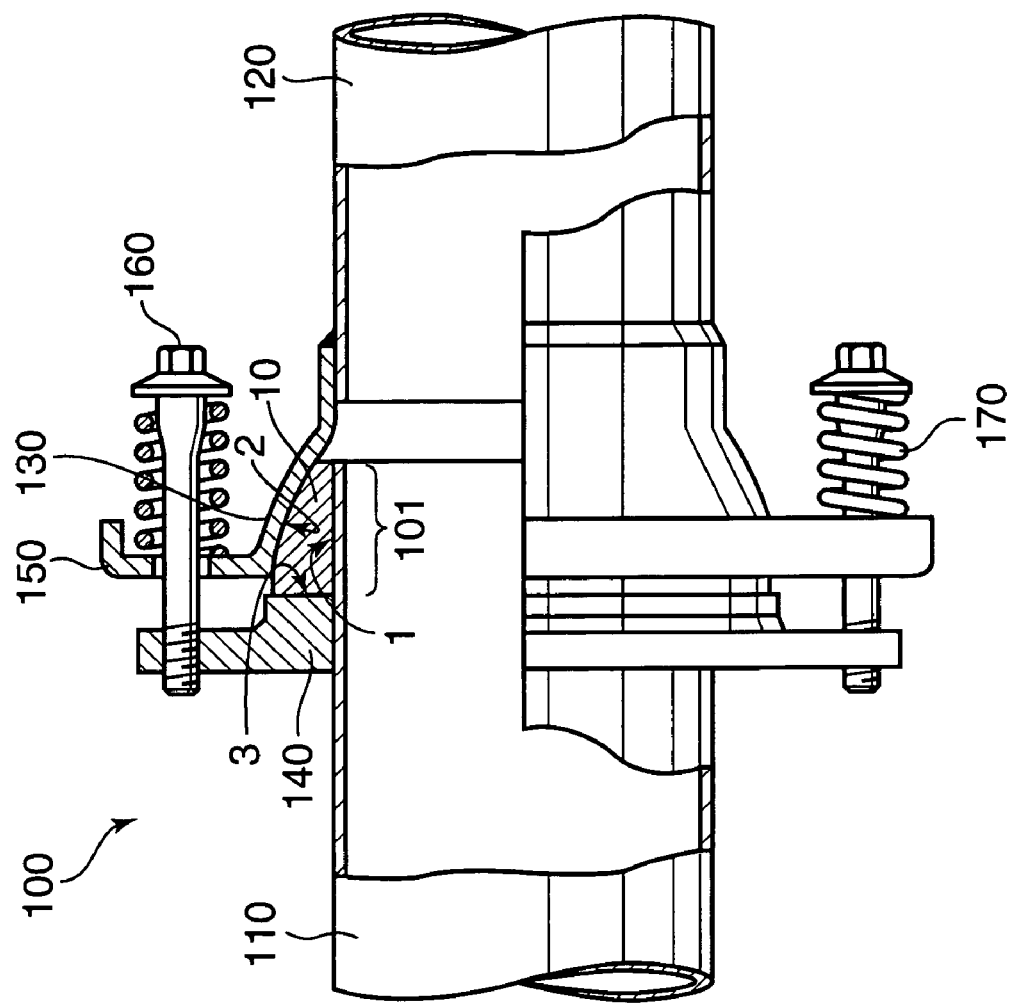
FIG. 15 is a partially sectional view showing a spherical exhaust pipe joint incorporated with the spherical zone annular seal member shown in FIG. 1.

The annular seal member 10 having the above features is fittingly mounted on the pipe end portion 101 of the spherical joint 100 for the exhaust pipe as shown in FIG. 15, and is used as an exhaust gas seal member.

On the partially convex spherical surface 2 of the annular seal member 10, there is exposed the wire mesh formed with the dispersive plating layer, in which at least one kind of particle selected from the group consisting of fluorine resin particles, boron nitride particles, molybdenum disulfide particles, and silicon carbide particles is dispersed. Use of the annular seal member 10 as a seal member for a spherical exhaust pipe joint enables reduction of a friction resistance of the partially convex spherical surface 2 serving as the sliding surface of the annular seal member 10 against the surface of the seal seat 130 of the spherical exhaust pipe joint, and reduction of abrasion of metal materials.

Second Embodiment

An exemplified production method of the annular seal member is described in the first embodiment. The annular seal member production method of the invention is not limited to the foregoing production method.

In the aforementioned production method, the annular seal member is produced by winding the heat-resistant seal sheet along with the dispersive-plated zone wire mesh formed with the dispersive plating layer over the entirety of the wire mesh surface to form the convolute member, and by compression molding the convolute member.

Applying dispersive plating to a wire mesh including a portion thereof where the wire mesh is not exposed from the sliding surface of the seal member is, however, economically disadvantageous. In view of this, there is proposed an economically advantageous production method. Specifically, the annular seal member production method in the second embodiment comprises: forming a preform of an annular seal member (also called as an annular seal member preform in the specification) by compression molding a zone wire mesh (also called as a non-dispersive-plated zone wire mesh in the specification) to which a dispersive plating is not performed; placing a wire mesh formed with a dispersive plating layer (also called as a dispersive-plated wire mesh in the specification), over the annular seal member preform so that the outer peripheral surface of the annular seal member preform is substantially covered; and compression molding the dispersive-plated wire mesh and the annular seal member preform together. The production method enables production of a wire mesh having a feature that the wire mesh formed with the dispersive plating layer is exposed exclusively from at least one surface selected from the group consisting of the outer peripheral surface and the inner peripheral surface of the annular seal member, serving as sliding surface.

The aforementioned production method is described in detail referring to FIGS. 7A through 7C.

First, an annular seal member preform 30 as shown in FIG. 7A is formed by compression molding in a similar manner as in the first embodiment except that a non-dispersive-plated zone wire mesh is used.

A dispersive-plated wire mesh 34 formed with a dispersive plating layer is produced, as shown in FIG. 7B. Then, the annular seal member preform 30 is covered with the dispersive-plated wire mesh 34, as shown in FIG. 7C.

The configuration of the dispersive-plated wire mesh 34 is not specifically limited. Normally, the dispersive-plated wire mesh 34 may have such dimensions and configuration as to cover the outer peripheral surface of the annular seal member preform 30.

Then, the annular seal member preform 30 covered with the dispersive-plated wire mesh 34 is mounted in the bottomed annular die 20 as shown in FIG. 6 for compression molding, whereby an annular seal member is produced, with a compressed wire mesh with the dispersive plating layer exposed exclusively from the outer peripheral surface of the annular seal member, as the sliding surface.

Third Embodiment

The annular seal members 10 described in the first embodiment and the second embodiment have the feature that the partially convex spherical surface 2 corresponding to the outer peripheral surface of the annular seal member 10 serves as a sliding surface.

Alternatively, an annular seal member of the invention may have such a configuration that an inner peripheral surface thereof serve as a sliding surface. An example of the annular seal member is described in the following.

Figure 8:
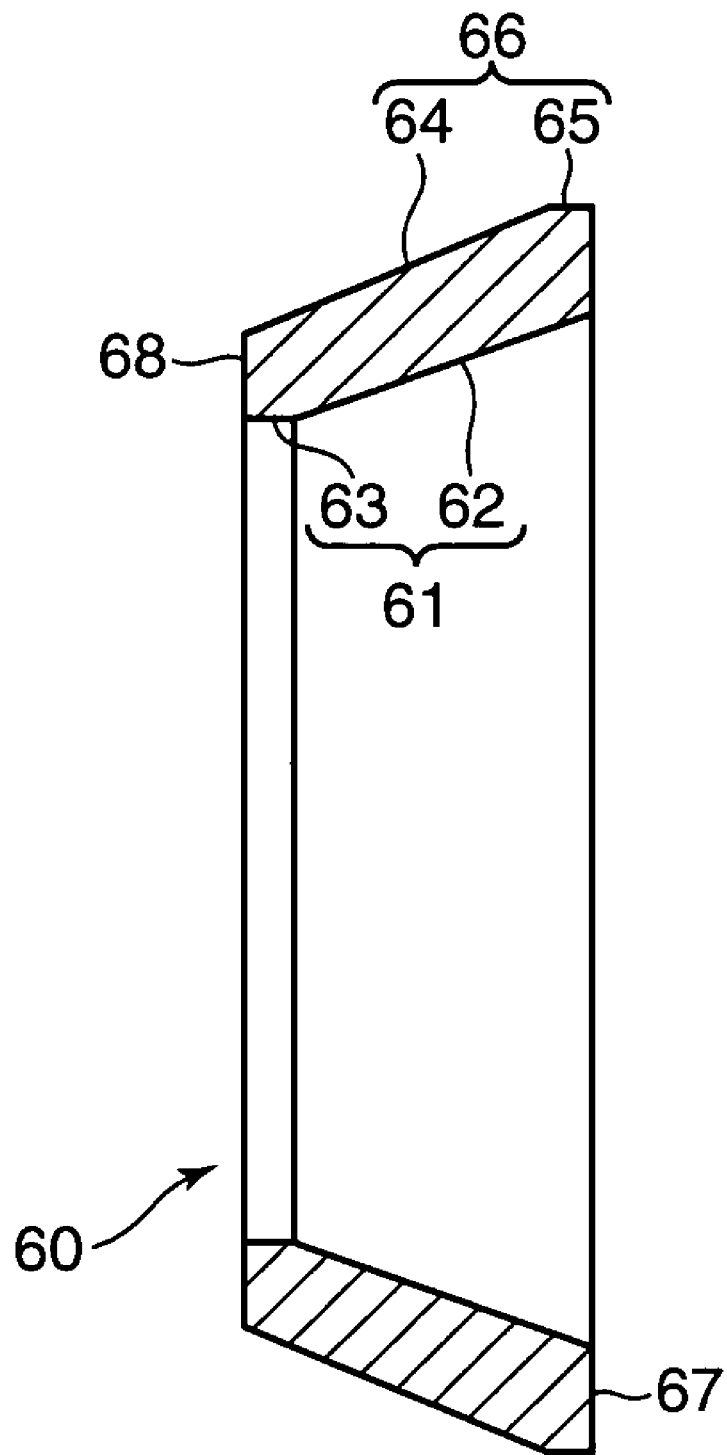
FIG. 8 is a diagram showing an example of a configuration of an annular seal member in a third embodiment of the invention.

An annular seal member 60 shown in FIG. 8 is an annular seal member for use in a spherical exhaust pipe joint, wherein the annular seal member has an inner peripheral surface serving as a sliding surface.

The annular seal member 60 includes, in addition to a truncated conical surface 62, an inner peripheral surface 61 having a cylindrical inner surface 63 continuing from the truncated conical surface 62; an outer peripheral surface 66 having a truncated conical outer surface 64 corresponding to the truncated conical surface 62, and a cylindrical outer surface 65 continuing from the truncated conical outer surface 64; and annular end surfaces 67 and 68 formed on a large-diameter side and a small-diameter side of the truncated conical surface 62, respectively.

Figure 9:
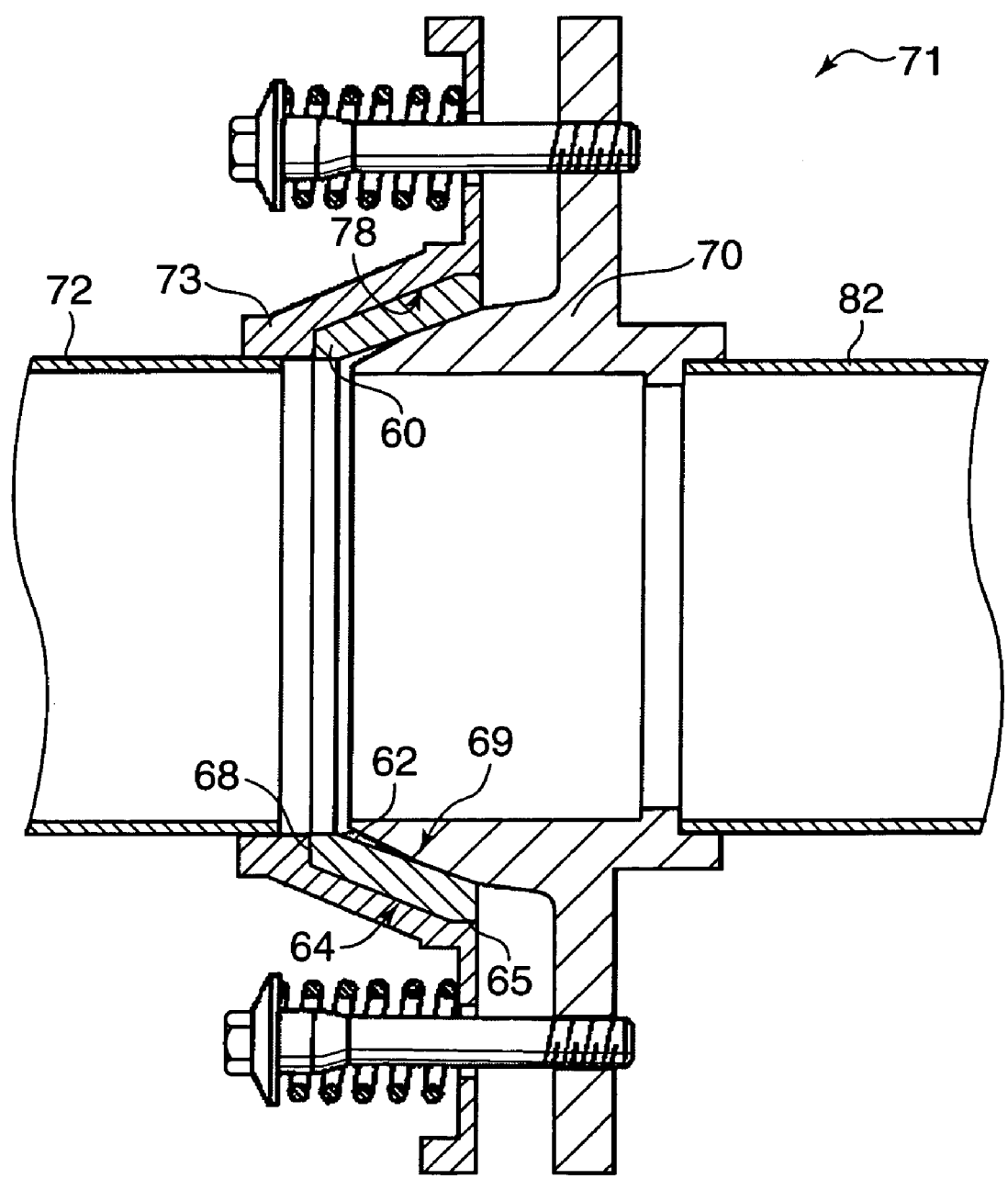
FIG. 9 is a cross-sectional view of a spherical exhaust pipe joint incorporated with the annular seal member in the third embodiment of the invention.

In use, the annular seal member 60 having the above configuration is incorporated in a spherical joint 71 for an exhaust pipe, as shown in FIG. 9, for instance.

Referring to FIG. 9, 72 and 82 each denotes an exhaust pipe. A flange portion 73 is fixed to an outer peripheral surface of the exhaust pipe 72 by welding or a like technique. The annular seal member 60 is fittingly mounted on the exhaust pipe 72, with the outer peripheral surfaces 64 and 65, and the annular end surface 68 of the annular seal member 60 in fitting contact with an inner peripheral surface 78 of the flange portion 73.

A flange portion 70 having a partially convex spherical portion 69 is fixed to the exhaust pipe 82 opposingly connected to the exhaust pipe 72 by welding or a like technique. The exhaust pipe 82 is arranged in such a manner that the partially convex spherical portion 69 is slidably contacted with the truncated conical inner surface 62 of the annular seal member 60.

With the annular seal member 60 having the above configuration, oscillations of an automobile may cause friction noise at a contact surface where the partially convex spherical portion 69 of the flange portion 70 is contacted with the truncated conical inner surface 62 of the annular seal member 60.

In view of the above, in use of the annular seal member 60 having the aforementioned configuration, a dispersive plating layer is formed at least on the surface of the wire mesh that is exposed from the truncated conical inner surface 62. This can suppress friction noise generated at the contact surface where the partially convex spherical portion 69 of the flange portion 70 is contacted with the truncated conical inner surface 62 of the annular seal member 60.

The annular seal member for use in a spherical exhaust pipe joint described in the first through the third embodiments have the features that fluorine resin particles, boron nitride particles, molybdenum disulfide particles, and silicon carbide particles capable of providing enhanced lubricity and abrasion resistance are adhered onto the wire mesh that is exposed from the sliding surface of the annular seal member with high adhesion. In this way, the adhesion of the particles onto the wire mesh surface by dispersive plating enables providing enhanced adhesion, as compared with an arrangement that a lubricating substance is adhered onto the sliding surface, using a binder including a resin component or a like component. Use of the annular seal member described in the embodiment in a spherical exhaust pipe joint enables suppression of friction noise that may be generated by friction of the annular seal member against the seal seat, particularly, friction noise that may be generated at high temperature ambient. The annular seal member for use in a spherical exhaust pipe joint is preferably used as an annular seal member for sealing a spherical joint for an exhaust pipe to be used in drawing exhaust air outside from an engine of an automobile, a two-wheeled motor vehicle, or a like vehicle, particularly, for sealing a spherical joint at a pipe portion relatively close to the engine as a high temperature section.

In the following, the inventive annular seal member for use in a spherical exhaust pipe joint, and the production method thereof will be described in detail referring to examples. It should be appreciated that the invention is not limited to the examples.

EXAMPLES

Example 1

[Production of Zone Wire Mesh]

As shown in FIG. 3, a cylindrical wire mesh 7 with a mesh area of 4 mm square obtained by weaving or knitting two fine metal wires each made of SUS 304 stainless steel and with a diameter of 0.28 mm was passed between the pair of rollers 8 and 9, followed by pressing and winding.

Then, the wire mesh was cut into a zone wire mesh 15 of 35 mm in width (W) and 360 mm in length (L).

[Production of Dispersive-plated Wire Mesh]

In a similar manner as the production process of the zone wire mesh, a cylindrical wire mesh with a mesh area of 3 mm square obtained by weaving or knitting a fine metal wire made of SUS304 stainless steel and with a diameter of 0.28 mm was passed between the pair of rollers 8 and 9, followed by pressing and winding. Thus, a zone wire mesh with 82 mm in width for covering was produced.

A dispersive plating layer was formed on the aforementioned zone wire mesh for covering by the following process.

Specifically, a dispersive plating solution containing a metal matrix material including a Ni—P alloy, and PTFE particles with a content of 6% by mass relative to the total content of the Ni—P alloy and the PTFE particles was prepared. The zone wire mesh was immersed in the plating solution for an electroless plating. Thus, a dispersive plating layer was formed on the wire mesh surface. After the formation of the dispersive plating layer, the zone wire mesh was heat-treated for one hour. Thus, a dispersive-plated zone wire mesh for covering was produced.

An average particle diameter of the PTFE particles contained in the dispersive plating layer was 0.3 μm, and a thickness of the dispersive plating layer was 7 μm.

Next, the dispersive-plated zone wire mesh for covering was cut into a dispersive-plated wire mesh 34 with 82 mm in width (W) and 35 mm in length (L).

[Production of Spherical Zone Annular Seal Member Preform]

As shown in FIG. 4, a zone wire mesh 15 with 35 mm in width and 360 mm in length was superposed over an expansive graphite sheet (PF-G3, product of Toyo Carbon Co., Ltd.) with 55 mm in width, 540 mm in length, and 0.4 mm in thickness, as a heat-resistant seal sheet 16 to form a laminated member. Then, the laminated member as shown in FIG. 5 was wound into a convolute shape so that the heat-resistant seal sheet 16 was exposed out of the zone wire mesh 15 by one turn. Thus, a convolute member 14 was produced, with the heat-resistant seal sheet 16 exposed from the inner peripheral surface and the outer peripheral surface of the zone wire mesh 15.

Next, as shown in FIG. 6B, a bottomed annular die 20 with a cylindrical wall surface 18 and a partially concave spherical wall surface 19 continuing from the cylindrical wall surface 18 on the inner surface thereof was prepared. The convolute member 14 was coaxially placed on a solid cylindrical core 21, which was provided in the middle part of the bottomed annular die 20 to form a cylindrical inner surface of an annular seal member. Then, the convolute member 14 was compressed in the die with a pressure of 20 MPa. By performing the above process, produced was an annular seal member preform 30, as shown in FIG. 7A, having a configuration defined by: a cylindrical inner surface 31 for defining a through-hole to be formed in the middle part of the annular seal member; a partially convex spherical surface 32; an annular end surface 33 formed on a large-diameter side of the partially convex spherical surface 32; and an annular end surface formed on a small-diameter side of the partially convex spherical surface 32.

The annular seal member preform 30 produced by the above process had 49.5 mm in the diameter of the cylindrical inner surface 31, 63 mm in the large diameter of the partially convex spherical surface 32, 53.5 mm in the small diameter of the partially convex spherical surface 32, and 30 mm in the height of the annular seal member preform 30.

Next, as shown in FIG. 7B, the dispersive-plated wire mesh 34 was opened into a cylindrical shape, and the opened dispersive-plated wire mesh 34 was covered onto the partially convex spherical surface 32 of the annular seal member preform 30, as shown in FIG. 7C.

Then, the annular seal member preform 30 covered with the dispersive-plated wire mesh 34 was subjected to compression molding at a pressure of 300 MPa, using a die identical to the die in the above process. Thereby, a spherical zone annular seal member 10 having such a configuration as shown in FIG. 1 was produced, wherein the dispersive-plated wire mesh was exposed from the outer peripheral surface of the partially convex spherical surface.

The spherical zone annular seal member 10 had 16.5 mm in the height thereof, 49 mm in the diameter of the cylindrical inner surface, 63.5 mm in the large diameter of the partially convex spherical surface, and 53.5 mm in the small diameter of the partially convex spherical surface.

[Assessment Method of Annular Seal Member]

Figure 10:
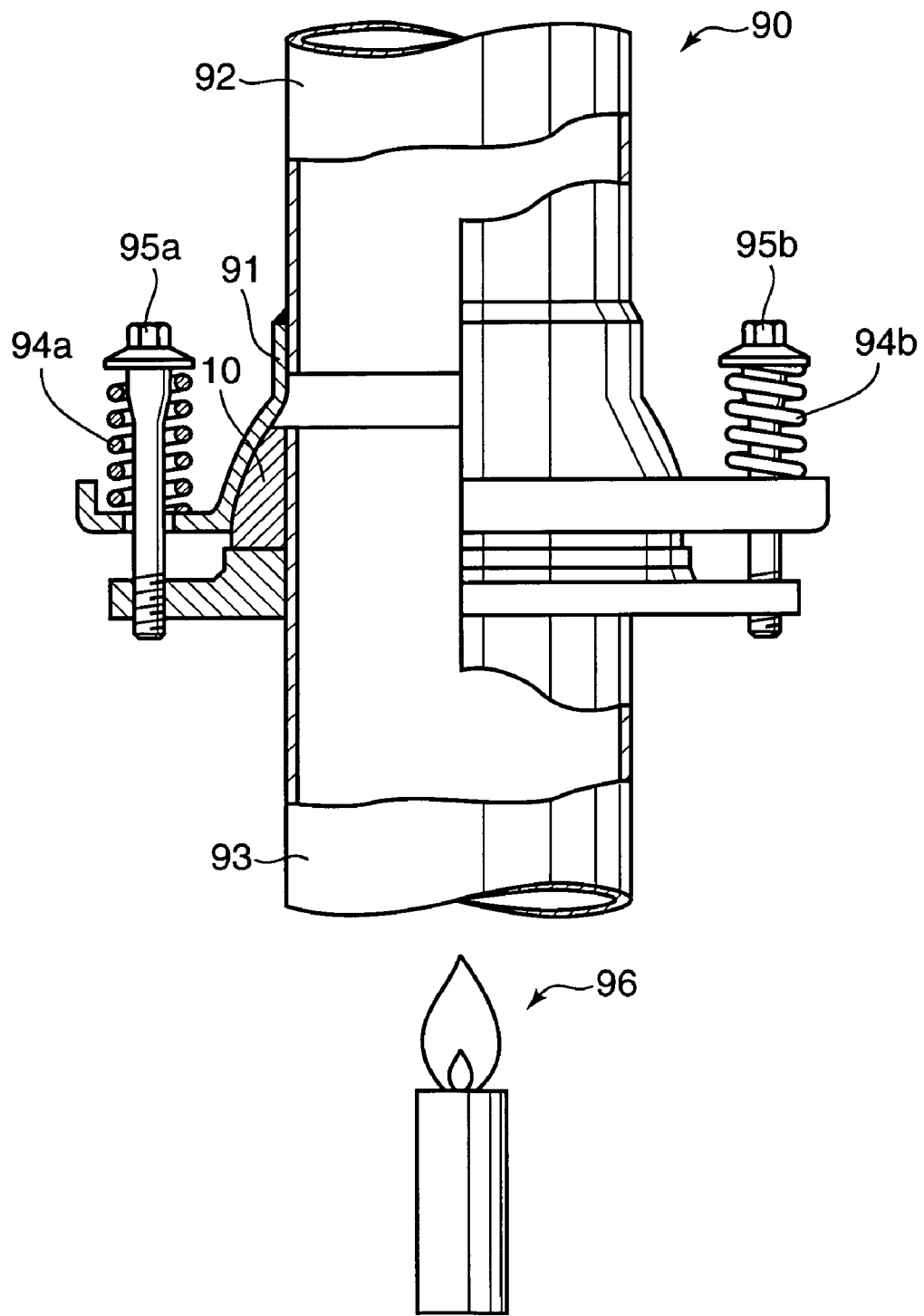
FIG. 10 is a partially sectional view of a spherical exhaust pipe joint unit for use in assessing examples.

The spherical zone annular seal member was mounted on a spherical exhaust pipe joint unit 90 comprising two exhaust pipes 92, 93 each with a diameter of 48 mm, and a spherical joint for connecting the exhaust pipes 92, 93, as shown in FIG. 10. The exhaust pipes 92 and 93 were fixed to each other in such a manner that a relative angular displacement was allowed by bolts 95a and 95b via coil springs 94a and 95b, respectively. The exhaust pipes were urged to each other by a spring force of about 590N.

A gas burner 96 was disposed below the spherical exhaust pipe joint unit 90 to heat the spherical exhaust pipe joint unit 90.

The spherical exhaust pipe joint unit 90 was oscillated by an oscillating device under an oscillation condition of an oscillation angle of ±4° and an oscillation frequency of 12 Hz. The oscillation was conducted under the following temperature condition.

Specifically, the spherical exhaust pipe joint unit 90 was placed in a temperature condition of about 25° C. for 50 minutes, followed by heating to 500° C., and placing in a temperature condition of 500° C. for 5 hours and 10 minutes. The cycle of 6 hours was repeated four times, and the level of friction noise, the weight reduction rate, and the gas leakage amount were assessed each time the cycle was over by the following method.

(Assessment on Friction Noise)

Sound pressure levels of friction noise were measured at the points of time (i) when 50 minutes had elapsed at 25° C., and (ii) when 5 hours and 10 minutes had elapsed at 500° C.

Figure 11:
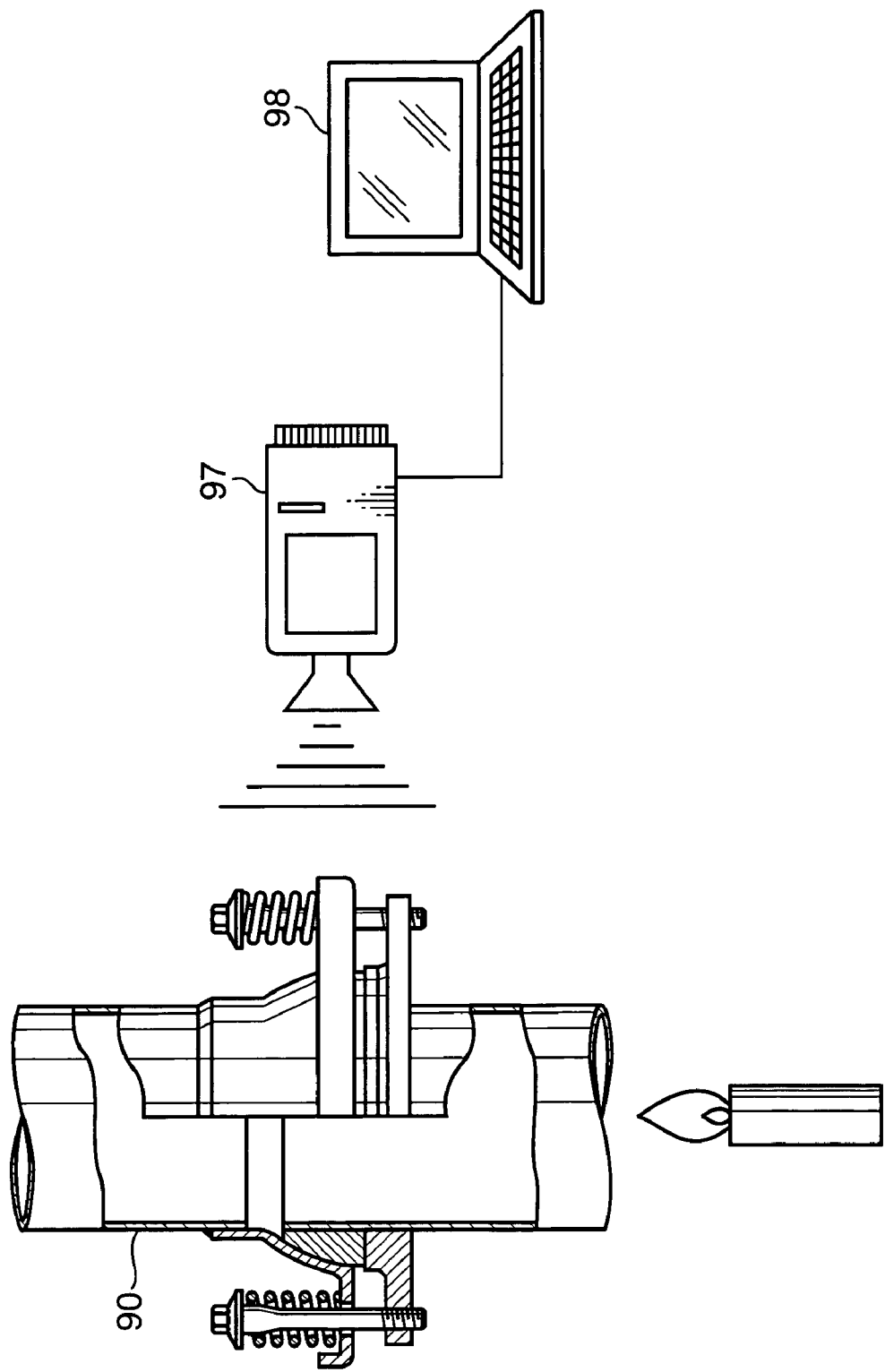
FIG. 11 is a diagram showing an arrangement of an apparatus for assessing friction noise generated from the examples.

The measurements were conducted, as shown in FIG. 11, by disposing an integrating sound level meter 97 (product of ACO Co., Ltd. TYPE6226) at a position 10 cm away from the spherical exhaust pipe joint unit 90 set on the oscillating device, and by reducing the frequency of the spherical exhaust pipe joint unit 90 to 1.6 Hz to suppress noise other than the friction noise.

Figure 12:
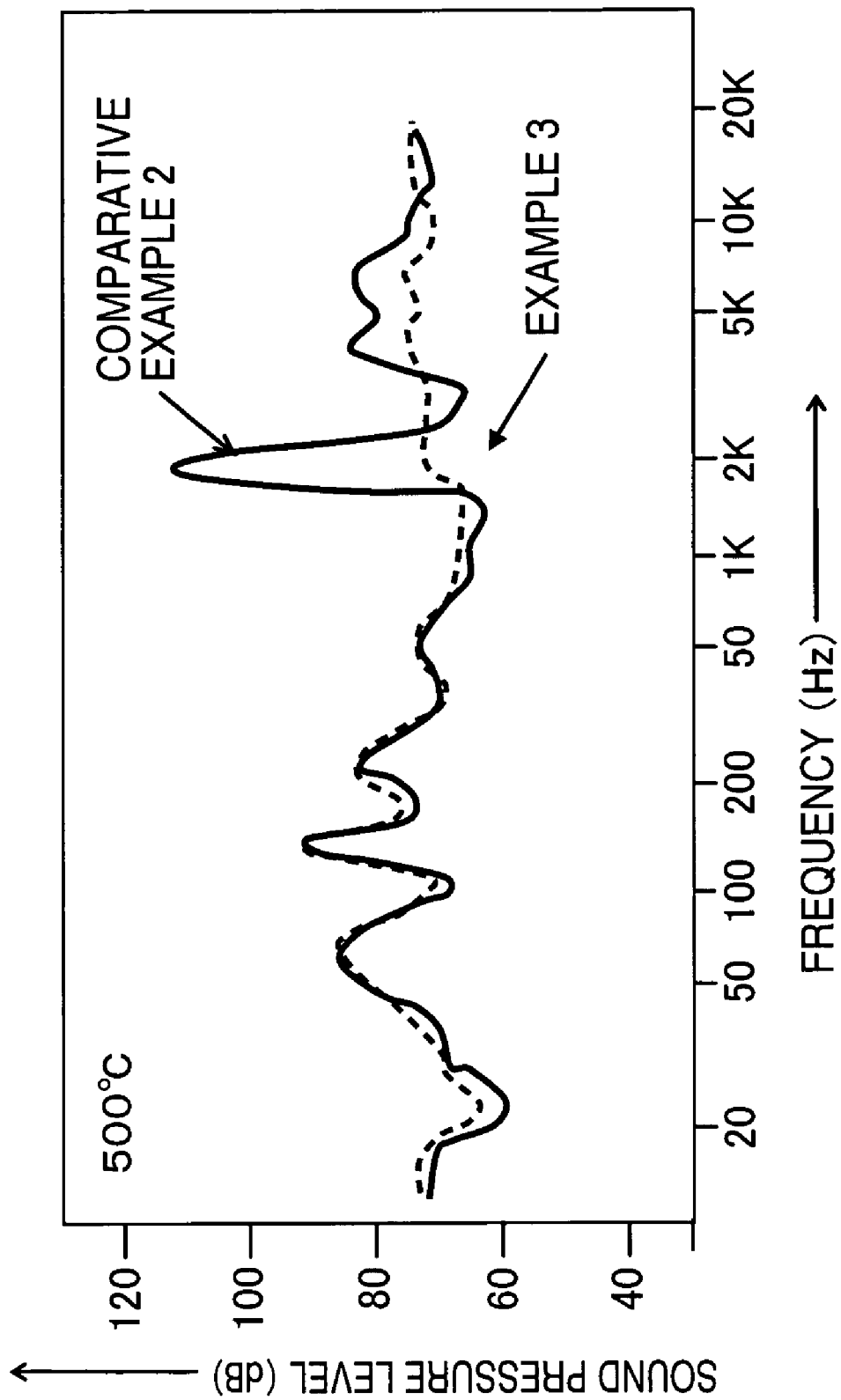
FIG. 12 is a graph showing frequency dependencies of sound pressure level at 500° C., based on an assessment result on friction noise generated from the examples.
Figure 13:
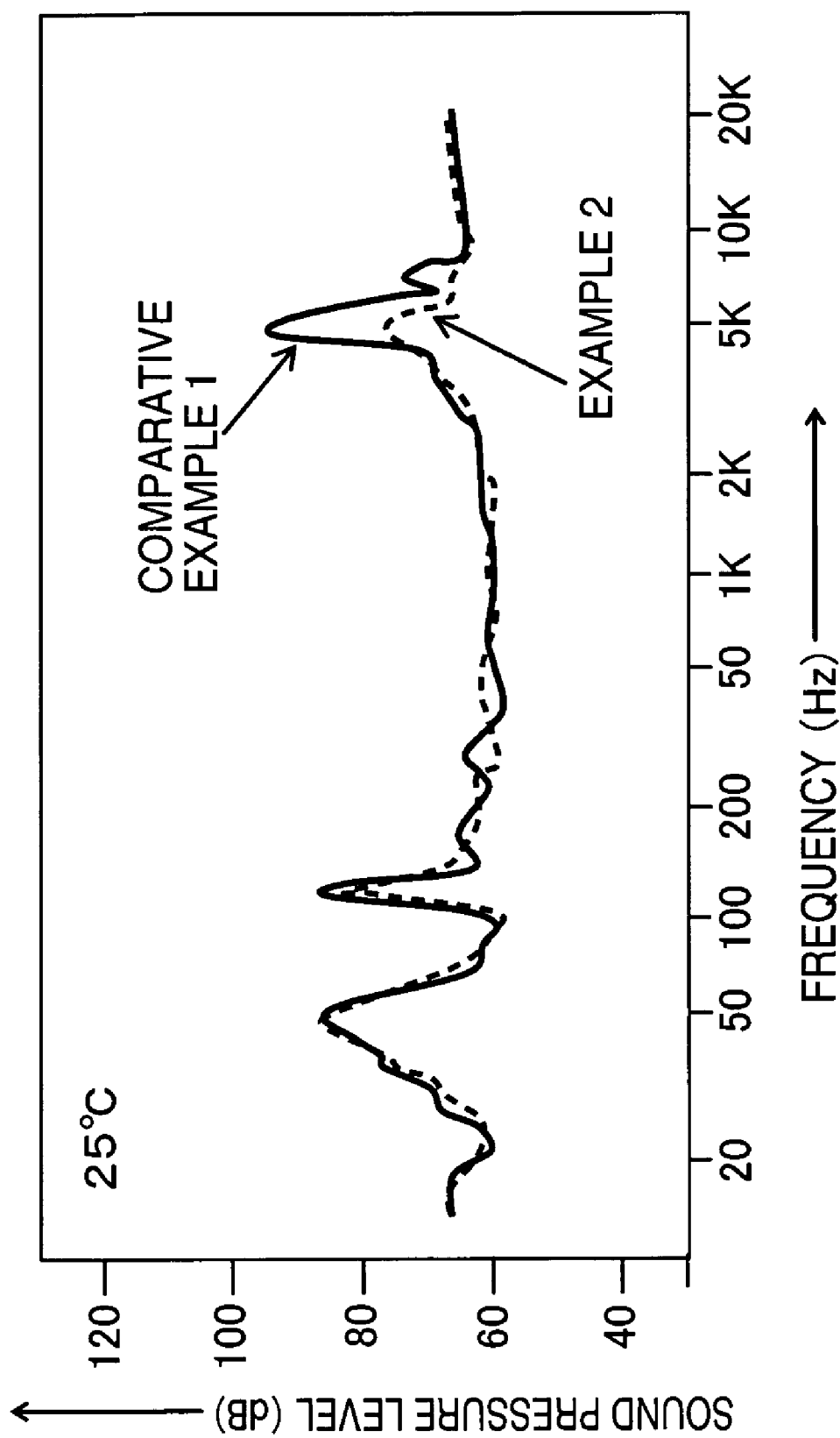
FIG. 13 is a graph showing frequency dependencies of sound pressure level at 25° C., based on an assessment result on friction noise generated from the examples.
Figure 14:
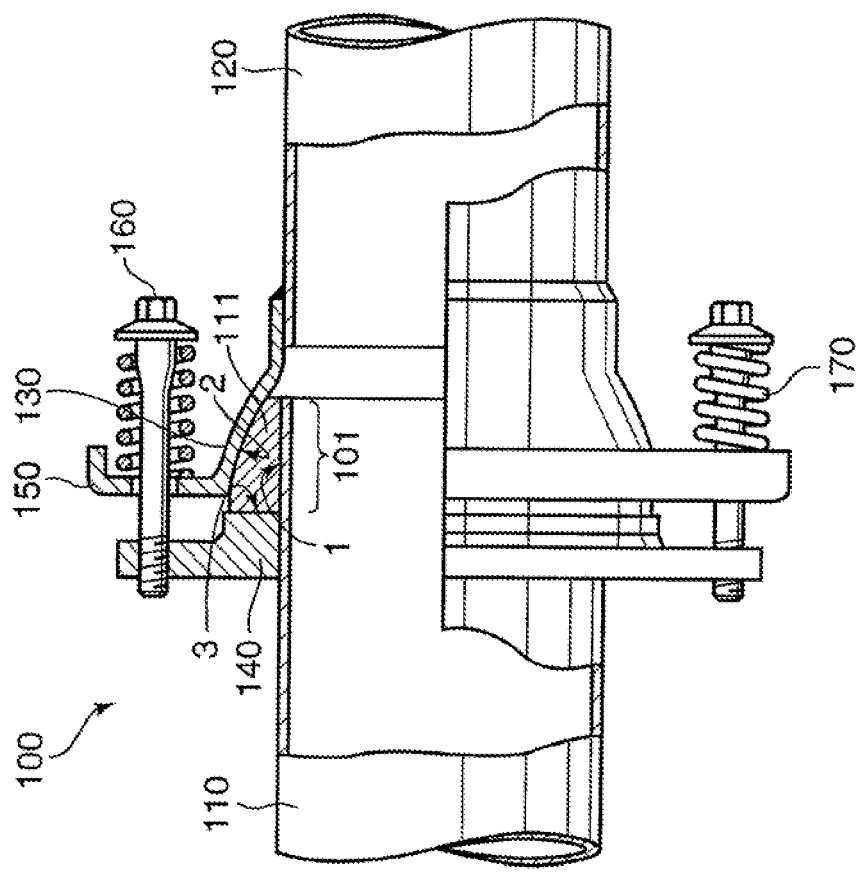
FIG. 14 is a partially sectional view showing a spherical exhaust pipe joint incorporated with a conventional spherical zone annular seal body.

The measurement data was outputted to a general purpose personal computer 98, and frequency dependencies of the sound pressure level were analyzed by a spectrum analyzer (software product of SOUND TECHNOLOGY). Examples of the analysis results on friction noise are shown in FIGS. 12 and 13.

Also, a sensory assessment using the hearing sense was conducted concerning friction noise according to the following criteria.

S: friction noise is hardly audible.

A+: friction noise is slightly audible when a tester's ear is in close contact with the spherical exhaust pipe joint unit.

A: friction noise is not audible within 1 m away from the spherical exhaust pipe joint unit.

A−: friction noise is not audible within 2.5 m away from the spherical exhaust pipe joint unit.

F: friction noise is audible 2.5 m away from the spherical exhaust pipe joint unit.

(Weight Reduction Rate)

Each time the cycle was over, the annular seal member was detached from the spherical exhaust pipe joint unit, and the weight of the annular seal member was measured. A weight reduction rate concerning the weight of the annular seal member after the cycle test relative to the weight of the annular seal member before the cycle test was measured.

(Gas Leakage Amount)

Each time the cycle was over, an end of the spherical exhaust pipe joint unit was closed, and the air of 30 kPa (0.3 kgf/cm$^2$) was drawn into the spherical exhaust pipe joint unit through the other end thereof. The leakage amount of the air from the annular exhaust pipe joint unit per minute was measured.

Example 2

An annular seal member was produced in the similar manner as in Example 1 except that in a process of forming a dispersive plating layer, used was a dispersive-plated wire mesh formed by using silicon carbide (SiC) particles of an average particle diameter of 1 μm according to an electroless plating technique, in place of using the PTFE particles as in Example 1.

The annular seal member was assessed according to the same assessment method as in Example 1.

Example 3

An aqueous dispersion containing PTFE (polyfuron dispersion D-1E (trade name) containing PTFE, product of Daikin Industries, Ltd.) was applied onto the partially convex spherical surface of the annular seal member preform obtained in Example by brushing. Then, an aqueous dispersion containing boron nitride (Sho BN UHP-1, product of Showa Denko Kabushiki Kaisha) was sprayed, followed by drying. Thus, a lubricating layer was formed.

Next, in a manner similar to Example 1, a dispersive-plated wire mesh 34 was covered onto an annular seal member preform, followed by compression molding. Thus, a spherical zone annular seal member was produced. The spherical zone annular seal member was assessed by the same assessment method as in Example 1.

Example 4

A lubricating layer was formed on the partially convex spherical surface of the spherical zone annular seal member preform obtained in Example 2 in the similar manner as in Example 3. Thus, a spherical zone seal member was produced in the similar manner as in Example 3, and assessed by the same assessment method as in Example 1.

Examples 5 Through 14

Spherical zone annular seal members were produced in the similar manner as in Example 3 except that the thickness of the plating layer, and the content ratio of PTFE particles were adjusted as recited in Table 4. A sensory assessment using the hearing sense was conducted concerning friction noise.

Comparative Example 1

A spherical zone annular seal member was produced and assessed in the similar manner as in Example 1 except that a non-dispersive-plated wire mesh was used, in place of using the dispersive-plated wire mesh 31 in Example 1.

Comparative Example 2

A spherical zone seal member was produced by forming a lubricating layer on the partially convex spherical surface of the spherical zone annular seal member produced in Comparative Example 1 in the similar manner as in Example 3. The spherical zone seal member was assessed by the same assessment method as in Example 1.

The assessment results on the examples and the comparative examples are shown in Tables 1 through 4.

TABLE 1

| | | | 500(° C.) sound pressure level (dB) and sensory assessment result around 2.0 KHz | | | | | | | | 25(° C.) sound pressure level (dB) and sensory assessment result around 5.3 KHz | | | | | | | |
|---|---|---|---|---|---|---|---|---|---|---|---|---|---|---|---|---|---|---|
| Example No. | Dispersive particles | Lubricating layer | 1st cycle | | 2nd cycle | | 3rd cycle | | 4th cycle | | 1st cycle | | 2nd cycle | | 3rd cycle | | 4th cycle | |
| Ex. 1 | PTFE | not formed | 70 | S | 69 | S | 71 | S | 73 | S | 72 | A+ | 73 | A+ | 74 | A+ | 75 | A+ |
| Ex. 2 | SiC | not formed | 68 | S | 69 | S | 72 | S | 73 | S | 73 | A+ | 72 | A+ | 74 | A+ | 77 | A+ |
| Ex. 3 | PTFE | formed | 66 | S | 68 | S | 69 | S | 70 | S | 68 | S | 66 | S | 65 | S | 66 | S |
| Ex. 4 | SiC | formed | 64 | S | 66 | S | 67 | S | 66 | S | 66 | S | 65 | S | 66 | S | 70 | S |
| C. Ex. 1 | not used | not formed | 66 | S | 79 | A+ | 114 | F | 118 | F | 73 | A+ | 88 | A | 90 | A | 95 | A |
| C. Ex. 2 | not used | formed | 65 | S | 77 | A+ | 105 | A− | 115 | F | 66 | S | 67 | S | 68 | S | 73 | S |

TABLE 2

| Example No. | Weight reduction rate (%) | | | |
|---|---|---|---|---|
| | 1st cycle | 2nd cycle | 3rd cycle | 4th cycle |
| Ex. 1 | 0.29 | 0.59 | 0.81 | 1.29 |
| Ex. 2 | 0.33 | 0.66 | 0.93 | 1.33 |
| Ex. 3 | 0.31 | 0.61 | 0.96 | 1.35 |
| Ex. 4 | 0.32 | 0.55 | 1.01 | 1.29 |
| C. Ex. 1 | 0.55 | 0.88 | 1.45 | 1.84 |
| C. Ex. 2 | 0.46 | 0.9 | 1.31 | 1.61 |

TABLE 3

| Example No. | Gas leakage amount (L/min) | | | |
|---|---|---|---|---|
| | 1st cycle | 2nd cycle | 3rd cycle | 4th cycle |
| Ex. 1 | 0.19 | 0.19 | 0.23 | 0.19 |
| Ex. 2 | 0.22 | 0.18 | 0.18 | 0.23 |
| Ex. 3 | 0.18 | 0.21 | 0.22 | 0.22 |
| Ex. 4 | 0.18 | 0.21 | 0.19 | 0.18 |
| C. Ex. 1 | 0.19 | 0.21 | 0.22 | 0.23 |
| C. Ex. 2 | 0.19 | 0.21 | 0.19 | 0.22 |

TABLE 4

| Example No. | Plating thickness (μm) | PTFE content (mass %) | 500(° C.) | | | | 25(° C.) | | | |
|---|---|---|---|---|---|---|---|---|---|---|
| | | | 1st cycle | 2nd cycle | 3rd cycle | 4th cycle | 1st cycle | 2nd cycle | 3rd cycle | 4th cycle |
| 5 | 3 | 5 | S | S | A | A− | S | S | S | S |
| 6 | 5 | 5 | S | S | S | A+ | S | S | S | S |
| 7 | 5 | 8 | S | S | S | S | S | S | S | S |
| 8 | 5 | 15 | S | S | S | A+ | S | S | S | S |
| 9 | 7 | 5 | S | S | S | S | S | S | S | S |
| 10 | 7 | 8 | S | S | S | S | S | S | S | S |
| 11 | 7 | 12 | S | S | S | A | S | S | S | S |
| 12 | 10 | 8 | S | S | S | S | S | S | S | S |
| 13 | 14 | 5 | S | S | S | A | S | S | S | S |
| 14 | 15 | 15 | S | S | A+ | A | S | S | S | S |

FIGS. 12 and 13 also show examples of analysis results on frequency dependencies of sound pressure level measured by a sound level meter. FIG. 12 is a graph showing frequency dependencies of sound pressure level at 500° C. at the fourth cycle in Example 3 and Comparative Example 2. FIG. 13 is a graph showing frequency dependencies of sound pressure level at 25° C. at the fourth cycle in Example 2 and Comparative Example 1.

As shown in FIG. 12, there was observed a peak of sound pressure level around 2 kHz at high temperature ambient of 500° C.

As shown in Table 1, the friction sounds at the fourth cycle at 500° C. in Examples 1 through 4 had sound pressure levels ranging from 66 to 73 dB at 2.0 kHz, and the sensory assessments on the friction sounds were all labeled with "S", which means that the friction sound is hardly audible. On the other hand, in Comparative Examples 1 and 2, the friction sounds were increased from the second cycle, and the sound pressure levels at 2.0 kHz at the fourth cycle were as high as 115 dB and 118 dB, respectively. The sensory assessment on the friction sounds in Comparative Examples 1 and 2 at the fourth cycle were both labeled with "F".

The results on weight reduction rate in Table 2 show that the weight reduction rates at the fourth cycle in Examples 1 through 4 were as low as from 1.29 to 1.35%, whereas the weight reduction rates at the fourth cycle in Comparative Examples 1 and 2 were as high as 1.84% and 1.61%, respectively. Thus, there was observed a considerable difference in abrasion resistance between Examples 1 through 4, and Comparative Examples 1, 2.

The results on gas leakage amount in Table 3 show that there was not observed a considerable difference between Examples 1 through 4, and Comparative Examples 1, 2.

On the other hand, the sensory assessment results using the hearing sense, concerning friction sounds from the annular seal members in Examples 5 through 14, in which the plating thickness and the content ratio of the dispersive particles were varied, show that the friction sound suppressing effect is particularly high in the plating thickness from 5 to 15 μm.

As described above in detail, an aspect of the invention is directed to an annular seal member for use in a spherical exhaust pipe joint provided with, on an inner peripheral surface or an outer peripheral surface thereof, a sliding surface for slidably moving the spherical exhaust pipe joint. The annular seal member comprises: an annular mesh structural body including a compressed wire mesh; and a heat-resistant sheet member which is compressed to be integrally formed with the compressed wire mesh, wherein at least a part of the compressed wire mesh which is exposed from the sliding surface has a dispersive plating layer in which at least one kind of particles selected from the group consisting of fluorine resin particles, boron nitride particles, molybdenum disulfide particles, and silicon carbide particles are dispersed.

The above arrangement is advantageous in suppressing friction noise that may be generated by abrasion of the sliding surface of the annular seal member against the surface of a seal seat, particularly, friction noise that may be generated by abrasion of metals at high ambient temperatures. Also, this arrangement enables to suppress abrasion of the sliding surface, which allows for retaining sealability of the annular seal member for an extended period.

Preferably, the annular seal member may have a spherical zone configuration including a cylindrical inner surface for defining a through-hole to be formed in the middle part of the annular seal member, and an outer peripheral surface shaped into partially convex spherical surface, and the outer peripheral surface shaped into the partially convex spherical surface may be the sliding surface. This arrangement is advantageous in reducing the friction noise in a conventional spherical exhaust pipe joint of a general configuration.

Preferably, the annular seal member for use in a spherical exhaust pipe joint may be a spherical zone seal member having a configuration defined by: a cylindrical inner surface; a partially convex spherical surface; an annular end surface formed on a large-diameter side of the partially convex spherical surface; and an annular end surface formed on a small-diameter side of the partially convex spherical surface. The spherical zone seal member may include a compressed wire mesh, and a heat-resistant seal member which is compressed and filled in the compressed wire mesh to be integrally formed with the compressed wire mesh. The compressed wire mesh may be exposed from the partially convex spherical surface to such a degree as to retain sealability of the annular seal member. The dispersive plating layer may be formed on at least the part of the compressed wire mesh which is exposed from the partially convex spherical surface.

Preferably, the dispersive plating layer may be a Ni (nickel) plating layer, or a Ni—P (nickel-phosphorous) plating layer, in which at least one kind of particle selected from the group consisting of fluorine resin particles, boron nitride particles, and molybdenum disulfide particles is dispersed. This arrangement provides particularly superior lubricity, and accordingly, is advantageous in suppressing friction noise.

Preferably, the dispersive plating layer may be a Ni plating layer, or a Ni—P plating layer, in which silicon carbide particles are dispersed. This arrangement provides particularly superior abrasion resistance, and accordingly, is advantageous in suppressing generation of metallic powders. Therefore, the arrangement is advantageous in suppressing friction noise resulting from abrasion of metallic powders.

Preferably, the dispersive plating layer may have a thickness from 5 to 15 μm, which is advantageous in providing superior durability while securing the friction noise suppressing effect.

Preferably, the annular seal member may further comprise a lubricating layer, on the sliding surface, containing at least one kind selected from the group consisting of fluorine resins, boron nitrides, and molybdenum disulfides. This is advantageous in reducing friction noise at an initial stage of oscillation.

Preferably, the compressed wire mesh may include a dispersive-plated compressed wire mesh having at least a part thereof being exposed from the sliding surface, and a non-dispersive-plated compressed wire mesh which is not exposed from the sliding surface. This is advantageous in providing a less costly annular seal member for use in a spherical exhaust pipe joint.

Another aspect of the invention is directed to a method for producing an annular seal member for use in a spherical exhaust pipe joint. The method comprises: a convolute member forming step of superposing, one on top of the other, a band-shaped heat-resistant seal sheet, and a dispersive-plated zone wire mesh having a dispersive layer in which at least one kind of particle selected from the group consisting of fluorine resin particles, boron nitride particles, molybdenum disulfide particles, and silicon carbide particles is dispersed to form a laminated member, and of winding the laminated member into a convolute member; a convolute member mounting step of mounting the convolute member in a bottomed annular die provided with a solid cylindrical core in the middle part of the bottomed annular die; and a compression molding step of compression molding the convolute member in a direction of a center axis of the convolute member. The production method is advantageous in easily producing the inventive annular seal member for use in a spherical exhaust pipe joint.

Yet another aspect of the invention is directed to a method for producing an annular seal member for use in a spherical exhaust pipe joint. The method comprises: a convolute member forming step of superposing a non-dispersive-plated zone wire mesh and a band-shaped heat-resistant seal sheet one on top of the other to form a laminated member, and of winding the laminated member into a convolute member; a first compression molding step of mounting the convolute member in a bottomed annular die provided with a solid cylindrical core in the middle part of the bottomed annular die, and of compression molding the convolute member in a direction of a center axis of the convolute member to form an annular seal member perform; and a second compression molding step of placing a dispersive-plated wire mesh in which at least one kind of particles selected from the group consisting of fluorine resin particles, boron nitride particles, molybdenum disulfide particles, and silicon carbide particles are dispersed over the annular seal member perform in such a manner that at least one surface selected from the group consisting of an outer peripheral surface and an inner peripheral surface of the annular seal member perform is covered by the dispersive-plated wire mesh, and of compression molding the dispersive-plated wire mesh and the annular seal member perform together. The production method is advantageous in producing the inventive annular seal member for use in a spherical exhaust pipe joint with a less cost.

The invention claimed is:

1. An annular seal member for use in a spherical exhaust pipe joint provided with a sliding surface for slidably moving the spherical exhaust pipe joint, in which the sliding surface is an inner peripheral surface or an outer peripheral surface of the annular seal member, said annular seal member comprising:
   an annular mesh structural body including a compressed wire mesh; and
   a heat-resistant sheet member which is compressed so as to be integrally formed with said compressed wire mesh, wherein
   at least a part of said compressed wire mesh is arranged so as to be exposed from the sliding surface, and has a dispersive plating layer in which at least one kind of particle is dispersed in a metal matrix material, said at least one kind of particle being selected from a group consisting of fluorine resin particles, boron nitride particles, molybdenum disulfide particles, and silicon carbide particles, and said metal matrix material being selected from a group consisting of nickel, nickel-based alloy, iron, and iron-based alloy.

2. The annular seal member for use in a spherical exhaust pipe joint according to claim 1, wherein
   said annular seal member has a middle part, a spherical zone configuration including a cylindrical inner surface for defining a through-hole to be formed in the middle part of the annular seal member, and an outer peripheral surface shaped into a partially convex spherical surface, and
   said outer peripheral surface shaped into the partially convex spherical surface is the sliding surface.

3. The annular seal member for use in a spherical exhaust pipe joint according to claim 1, wherein
   said dispersive plating layer is a Ni (nickel) plating layer, or a Ni—P ( nickel-phosphorous) plating layer, in which the at least one kind of particle selected from a group consisting of fluorine resin particles, boron nitride particles, and molybdenum disulfide particles is dispersed.

4. The annular seal member for use in a spherical exhaust pipe joint according to claim 1, wherein
   said dispersive plating layer is a Ni plating layer, or a Ni—P plating layer, in which silicon carbide particles are dispersed.

5. The annular seal member for use in a spherical exhaust pipe joint according to claim 1, wherein
said dispersive plating layer has a thickness from 5 to 15 μm.

6. The annular seal member for use in a spherical exhaust pipe joint according to claim 1, further comprising:
a lubricating layer on the sliding surface, and containing at least one kind selected from a group consisting of fluorine resins, boron nitrides, and molybdenum disulfides.

7. The annular seal member for use in a spherical exhaust pipe joint according to claim 1, wherein
the compressed wire mesh includes a dispersive-plated compressed wire mesh having at least a part thereof being exposed from the sliding surface, and a non-dispersive-plated compressed wire mesh which is not exposed from the sliding surface.

8. The annular seal member for use in a spherical exhaust pipe joint according to claim 1, wherein
a content ratio of said at least one kind of particle dispersed in said metal matrix material relative to a total content of said metal matrix material and said at least one kind of particle dispersed in said metal matrix material is 5 to 15% by mass.

* * * * *